United States Patent
Omotowa (10) Patent No.: US 8,163,262 B1
(45) Date of Patent: Apr. 24, 2012

(54) METHOD FOR PRODUCTION OF NITROGEN TRIFLUORIDE FROM TRIMETHYLSILYLAMINES

(76) Inventor: Bamidele A. Omotowa, Idaho Falls, ID (US)

( * ) Notice: Subject to any disclaimer, the term of this patent is extended or adjusted under 35 U.S.C. 154(b) by 0 days.

(21) Appl. No.: 12/983,988

(22) Filed: Jan. 4, 2011

(51) Int. Cl.
C01B 21/083 (2006.01)
(52) U.S. Cl. ........................................... 423/406
(58) Field of Classification Search ............. 423/406
See application file for complete search history.

(56) References Cited

U.S. PATENT DOCUMENTS

| | | | |
|---|---|---|---|
| 3,055,817 A | 9/1962 | Gordon | |
| 3,214,237 A | 10/1965 | Morrow | |
| 4,001,380 A | 1/1977 | Gordon | |
| 4,091,081 A | 5/1978 | Woytek | |
| 4,543,242 A | 9/1985 | Aramaki | |
| 4,975,259 A | 12/1990 | Hyakutake | |
| 5,069,887 A | 12/1991 | Suenaga | |
| 5,183,647 A | 2/1993 | Harada | |
| 5,637,285 A | 6/1997 | Coronell | |
| 6,183,713 B1 | 2/2001 | Tokunaga | |
| 6,821,496 B2 | 11/2004 | Igumnov | |
| 6,908,601 B2 | 6/2005 | Satchell, Jr. | |
| 6,984,366 B2 | 1/2006 | Syvret | |
| 6,986,814 B2 | 1/2006 | Wheat | |
| 7,018,598 B2 | 3/2006 | Ohno | |
| 7,045,107 B2 | 5/2006 | Dholakia | |
| 7,128,885 B2 | 10/2006 | Satchell, Jr. | |
| 7,384,618 B2 | 6/2008 | Singh | |
| 2006/0228285 A1 | 10/2006 | Singh | |
| 2007/0215460 A1 | 9/2007 | Tojo | |
| 2009/0280051 A1* | 11/2009 | Ohno et al. | 423/406 |

* cited by examiner

*Primary Examiner* — Stanley Silverman
*Assistant Examiner* — Justin Bova
(74) *Attorney, Agent, or Firm* — Robert L. Shaver; Dykas & Shaver, LLP (57) ABSTRACT

Presented is a method for Batch or continuous production of nitrogen trifluoride ($NF_3$) using direct fluorination of organic solution of trimethylsilylamines at low temperatures. Fluorine gas reacts with a solution of tris(trimethylsilyl)amine or bis(trimethylsilyl)amine in a suitable reactor to produce $NF_3$ in a continuous flow process. The crude product can be purified by a channeling the crude process flow through a scrubber to remove reactive byproducts and by cryogenic trapping of other non reactive byproducts in the process flow. Temperatures in the reaction and storage vessels are maintained to control the reaction products based on thermodynamics of the process and products. $NF_3$ is liquefiable at −126 degree Centigrade, and may be collected and used in other processes. The method also produce $NF_3$ as a continuous gas flow process where fluorine is channeled to contact micro droplet suspensions of bis(trimethylsilyl)amines in sulfur hexafluoride.

7 Claims, 4 Drawing Sheets

METHOD FOR PRODUCTION OF NITROGEN TRIFLUORIDE FROM TRIMETHYLSILYLAMINES

TECHNICAL FIELD

The present invention generally relates to methods for batch or continuous production of nitrogen trifluoride and more specifically to a method for production of nitrogen trifluoride by direct fluorination of trimethylsilylamines as a low temperature liquid phase process or as a gas phase process.

BACKGROUND

Nitrogen trifluoride ($NF_3$) is a colorless, toxic, odorless, nonflammable inorganic gas, with increasing use as an etchant in microelectronics, in the plasma etching of silicon wafers, in the cleaning of the PECVD chambers in the high volume production of liquid crystal displays and silicon-based thin film solar cells. In these applications $NF_3$ is initially broken down in situ, by plasma. The resulting fluorine atoms are the active cleaning agents that attack the polysilicon and silicon oxide. $NF_3$ has been considered as an environmentally preferable substitute for sulfur hexafluoride or perfluorocarbons such as hexafluoroethane.

$NF_3$ can be prepared from the reaction of elemental fluorine ($F_2$) with (i) ammonia ($NH_3$), (ii) nitrogen trichloride ($NCl_3$), or (iii) nonamethyltrisilylamine [$(Me_3Si)_3N$]. However, the reaction with $NCl_3$ is not feasible because it is an explosive reagent at temperatures as low $-196°$ C. The production of $NF_3$ involve oxidation of N(3−) to N(3+), and this transformation in commercial processes has required the use of $F_2$ as fluorinating agent. However, fluorine does not react with $N_2$.

The reaction of fluorine gas (bp=$-188°$ C.) with liquid $NH_3$ (bp=$-33°$ C.; mp=$-78°$ C.) is thermodynamically favored, and proceed readily, resulting in N—H→N—F+H-F exchange, or simply N—H→N—N+H-F. However, the yield of $NF_3$ gas is typically below 40%, because it is the least favored reaction among three possible mechanisms shown in Table 1.

Table 1: Thermodynamic feasibility of competitive mechanisms of the reactions of fluorine gas with liquid ammonia at $-40°$ C.

TABLE 1

Thermodynamic feasibility of competitive mechanisms of the reactions of fluorine gas with liquid ammonia at $-40°$ C.

| Reaction | mol $F_2$/ mol $NH_3$ | Log K, $-40°$ C. | $\Delta$H, KCal/ mol |
|---|---|---|---|
| 3 $F_2$ (g) + 8 $NH_3$ (l) $\xrightarrow{-40° C.}$ $N_2$ (g) + 6 $NH_4F$ | 1.5 | 308 | −370.6 |
| 4 $F_2$ (g) + 8 $NH_3$ (l) $\xrightarrow{-40° C.}$ $N_2F_2$ (g) + 6 $NH_4F$ | 2.0 | 308 | −354.0 |
| 3 $F_2$ (g) + 4 $NH_3$ (l) $\xrightarrow{-40° C.}$ $NF_3$ (g) + 3 $NH_4F$ | 3.0 | 201 | −216.6 |

In 1903, Otto Ruff prepared nitrogen trifluoride by the electrolysis of a molten mixture of ammonium fluoride and hydrogen fluoride. Today, commercially viable high yielding processes for production of $NF_3$ have improved the concentration of fluorine to the nitrogen based reagents, including ammonium bifluoride-hydrogen fluoride complexes in Table 2, and ammonium hexafluoride aluminates. These strategies have produced high yields for conversion of the ammonium salt to $NF_3$, but have had accompanying high cost of electricity; poor turnover of the $F_2$ flow in the process; and high maintenance cost from replacement of nickel reactor materials. Another approach has involved an engineering convenience by contacting independent gas phase dilutions of ammonia and fluorine in sulfur hexafluoride in a long vertical column at room temperature.

Table 2: Thermodynamic feasibility of competitive mechanisms of the reactions of fluorine gas with ammonium bifluoride

TABLE 2

Thermodynamic feasibility of competitive mechanisms of the reactions of fluorine gas with ammonium bifluoride

| Reaction | mol $F_2$/ mol $NH_4F$ | Log K, $-140°$ C. | $\Delta$H, KCal/ mol |
|---|---|---|---|
| 3 $F_2$ (g) + 2 $NH_4F \cdot 2HF$ (l) $\xrightarrow{140° C.}$ $N_2$ (g) + 10 HF (l) | 1.5 | 308 | −370.6 |
| 4 $F_2$ (g) + 2 $NH_4F \cdot 2HF$ (l) $\xrightarrow{140° C.}$ $N_2F_2$ (g) + 10 HF (l) | 2.0 | 308 | −354.0 |
| 5/2 $F_2$ (g) + $NH_4F \cdot 2HF$ (l) $\xrightarrow{140° C.}$ $NF_3$ (g) + 5 HF (g) | 3.0 | 201 | −216.6 |

Process economics show that the most expensive contributor to cost of production of $NF_3$ has been fluorine, because three moles of fluorine would be required for every nitrogen atom in the most efficient reaction. Yet the most efficient process still generates significant quantities of nitrogen ($N_2$) and tetrafluorohydrazine ($N_2F_2$), and requires costly purification procedures. Thus, the cost of commercial production of $NF_3$ is relatively higher than it is for many other inorganic fluorides.

Thermodynamic feasibility of the production of $NF_3$ versus $N_2F_2/N_2$ was highest at lower temperatures. The ratios of the logarithm of equilibrium constants for competitive mechanisms in the reaction of fluorine with $NH_4F$ is illustrated in Table 3.

Table 3: Comparison of temperature dependent Log k of equilibrium constant among three possible mechanisms shown in Table 1

TABLE 3

Comparison of temperature dependent Log k of equilibrium constant among three possible mechanisms shown in Table 1

| -80° C. | | -40° C. | | -0° C. | | 20° C. | | 140° C. | |
|---|---|---|---|---|---|---|---|---|---|
| $N_2/NF_3$ | $N_2F_2/NF_3$ | $N_2/NF_3$ | $N_2F_2/NF_3$ | $N_2/NF_3$ | $N_2F_2/NF_3$ | $N_2/NF_3$ | $N_2F_2/NF_3$ | $N_2/NF_3$ | $N_2F_2/NF_3$ |
| 308/219 | 308/219 | 308/184 | 302/184 | 283/159 | 263/159 | 266/149 | 247/149 | 202/110 | 186/110 |
| 1.41 | 1.41 | 1.67 | 1.64 | 1.78 | 1.65 | 1.79 | 1.66 | 1.84 | 1.69 |

*Data obtained from the HSC Chemistry 7.0 software

The present invention relates to using trimethylsilylamines reagents to prepare $NF_3$. The trimethylsilyl-nitrogen bond undergoes facile cleavage in the presence of reactive fluoride ion to produce very strong trimethylsilyl-fluoride bond, and the substitution of nitrogen by the conjugate anion. When the reagent is fluorine, an N—F bond is formed. Two trimethylsilylamines can be used to produce $NF_3$ in commercial production, that is tris(trimethylsilyl)amine (also called nonatrimethyltrisilazane) and hexamethyldisilazane. The trimethylsilylamines are very soluble in solvents that can be used as a medium for low temperature liquid processes, such as acetonitrile, and fluorocarbons. With this, a careful study of the temperature-dependent kinetics of the process can be determined to accurately control the effective supply of fluorine to the process.

SUMMARY OF THE INVENTION

Figure 2:
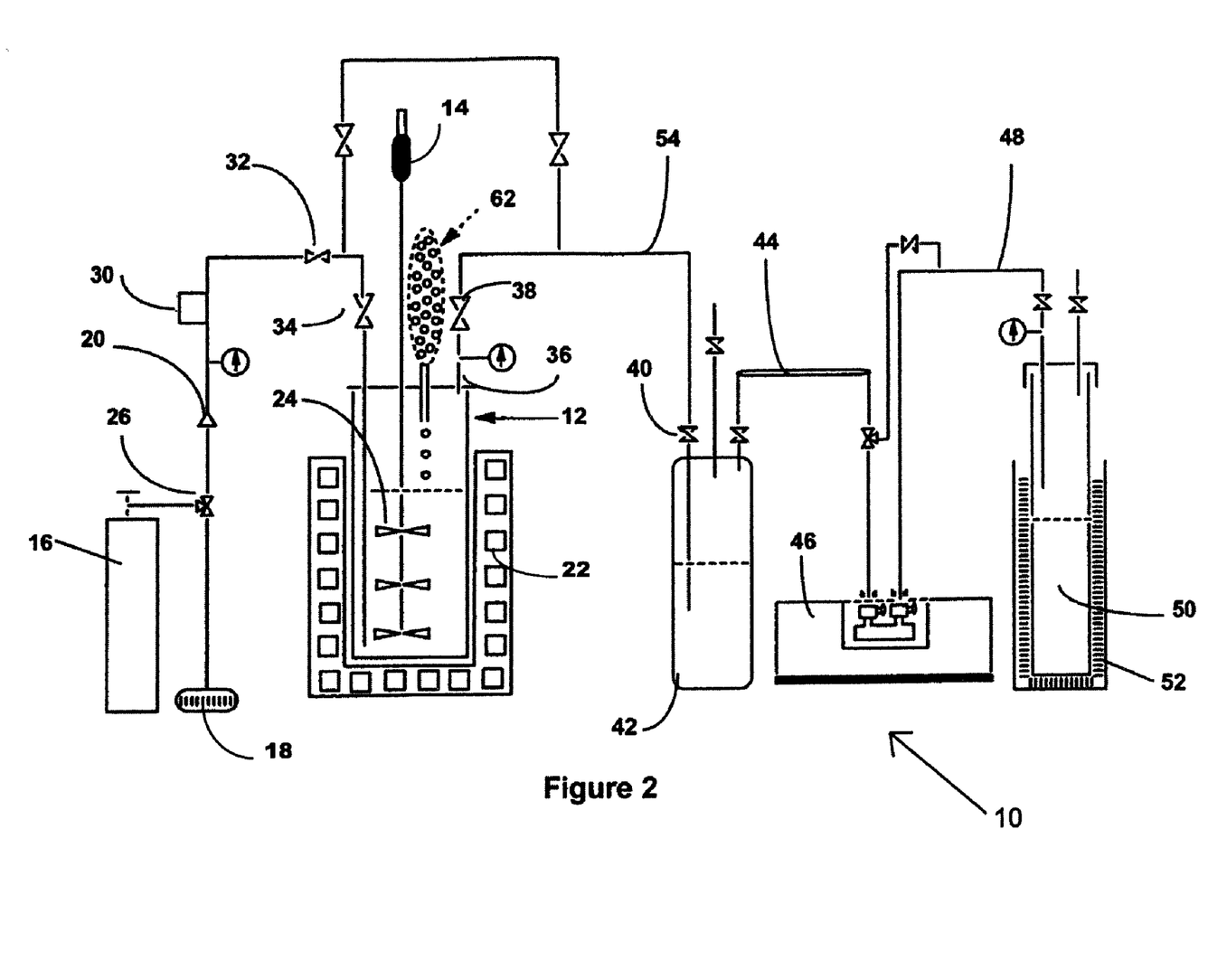
FIG. 2 is a diagram of liquid phase process for $NF_3$ production.

Liquid Phase Fluorination of Tris(Trimethylsilyl)Amine or Nonamethyltrisilazane Continuous production of $NF_3$ was achieved by passing 20% $F_2/N_2$ through ca. 0.1-10 M solution of tris(trimethylsilyl)amine $(Me_3Si)_3N$ in acetonitrile (MeCN) at between −4 and −45 degree Centigrade. The process was carried out in a polytetrafluoroethylene reactor with the set-up in FIG. 2. The progress of $NF_3$ production was monitored real-time by Fourier Transform infrared (FTIR) spectroscopy in the 1850-1950 cm$^{-1}$ region of the FTIR spectrum.

$$(Me_3Si)_3 N + 3 F_2 \xrightarrow[-40°\,C.]{MeCN} NF_3 + 3\, MeSiF \qquad \text{Eqn. 1}$$

Figure 1:
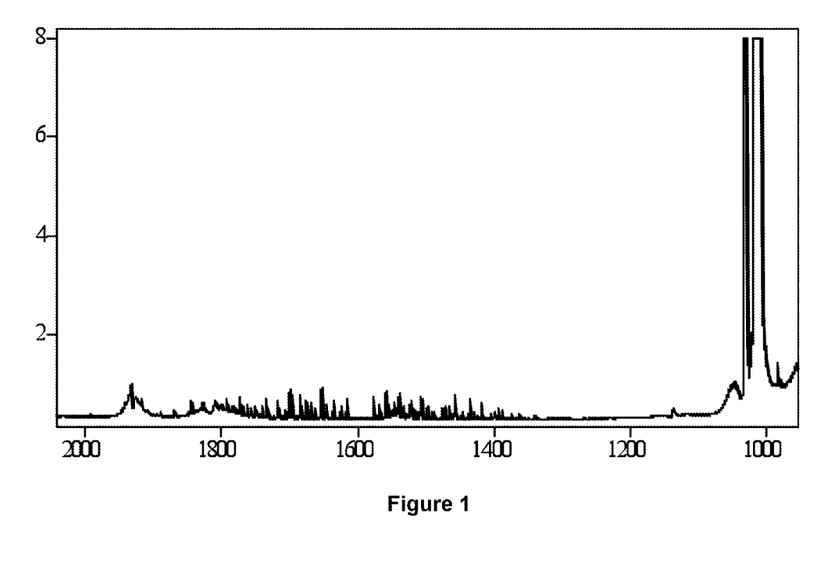
FIG. 1 is the FTIR absorbance spectrum of $NF_3$.

Tris(trimethylsilyl)amine, $(Me_3Si)_3N$, was dissolved in 250 cc anhydrous acetonitrile in a 375 cc polytetrafluoroethylene reactor (Apex instruments, Inc). The reactor was then sealed, and connected to the setup shown in FIG. 2. A flow of 200 standard cubic centimeter (sccm) dry nitrogen was passed through 0.1-10 M solution of tris(trimethylsilyl)amine in acetonitrile for 5 minutes to purge the reactor in continuous flow through the gas cell of the FTIR spectrometer, and to successive alkali and water scrubbers in FIG. 2. Then, the flow stream was changed to 20% $F_2/N_2$ at (i) 200 sccm for 40 minutes; and (ii) 400 sccm for the next 10 minutes. The FTIR absorbance peak in the analytical region for $NF_3$ in the 1850-1950 cm$^{-1}$ window was 0.065 when flow was 200 sccm, and increased to 0.13 when the flow was 400 sccm. This process is safe under the experimental condition. The FTIR data shown in FIG. 1 shows that the rate of formation of the fluorination of tris(trimethylsilyl)amine is a first order process. Therefore, the data was analyzed to (i) determine the rate of reaction; (ii) determine the fluorine absorption; and (iii) determine $NF_3$ yield (cf. theoretical expectation). This would confirm the elimination of the production of $N_2$, and $N_2F_2$.

The experimental data is summarized in Table 4. The plot of fluorination time (min.) versus the FTIR yield is presented in FIG. 2. The reaction of fluorine and tris(trimethylsilyl)amine follows a first order kinetics independent of flow of 20% $F_2/N_2$ flow at 200 sccm or 400 sccm. The percentage of fluorine absorption by the process was determined to be 60% under the particular experimental conditions that produced the results in Table 4. Based on FTIR quantification, direct fluorination of tris(trimethylsilyl)amine produced trimethylsilyl fluoride ($Me_3SiF$) and $NF_3$ exclusively. The total $NF_3$ production in the experiment show that over 99% of the nitrogen in tris(trimethylsilyl)amine was accounted in the amount of $NF_3$ produced. These results suggest that the production of $NF_3$ was the dominant mechanism of this process, unlike in reactions of fluorine with ammonia and ammonium fluoride where thermodynamics favor the production of $N_2$, and $N_2F_2$ over $NF_3$.

Liquid Phase Fluorination of Bis(Trimethylsilyl)Amine or Hexamethyldisilazane

Bis(trimethylsilyl)amine (also known as hexamethyldisilazane, or HMDS) is a colorless liquid organosilicon compound with the molecular formula $[(CH_3)_3Si]_2NH$ (or $Me_3Si)_2NH$ (bp, 125° C.). The molecule is a derived from the reaction of ammonia with trimethylsilyl chloride in place of two hydrogen atoms.

The production of $NF_3$ from bis(trimethylsilyl)amine, according to reaction in equation 2, was achieved by passing 20% $F_2/N_2$ through ca. 0.1-10 M solution of the amine reagent in acetonitrile (MeCN) at between −4 and −45 degree Centigrade in a polytetrafluoroethylene reactor with the setup in FIG. 2. The progress of the process was monitored real-time by Fourier Transform infrared (FTIR) spectroscopy.

$$(Me_3Si)_2N\text{-}H + 3 F_2 \xrightarrow[-40°\,C.]{MeCN} NF_3 + 2\, MeSiF + 3\, HF \qquad \text{Eqn. 2}$$

Bis(trimethylsilyl)amine, $(Me_3Si)_2NH$, was dissolved in 200 cc anhydrous acetonitrile in a 375 cc polytetrafluoroethylene reactor. The reactor was then sealed, and connected to the set up in FIG. 2. A flow of 200 cc dry nitrogen was passed through 0.1-1.0 M solution of bis(trimethylsilyl)amine in acetonitrile for 5 minutes to purge the reactor in continuous flow through the gas cell of the FTIR spectrometer, and to scrubbers shown in FIG. 2. The flow stream was then changed to 20% $F_2/N_2$ at (i) 200 sccm for 48 minutes; and (ii) 300 sccm for the next 33 minutes. The FTIR absorbance peak in the analytical region for calibration of $NF_3$ was constantly 0.051 for flow of 20% $F_2/N_2$ 200 sccm, and increased to a new constant of 0.079 when the flow was 300 sccm. The results show that fluorine flow could be engineered to ensure near quantitative absorption by the process.

Direct fluorination of bis(trimethylsilyl)amine is safe under the experimental conditions. The flow, and FTIR data show that the kinetics of the fluorination of bis(trimethylsilyl) amine is a first order process, and is independent of flow of 20% $F_2/N_2$ flow at 200 sccm or 400 sccm. The percentage of fluorine absorption by the process was determined to be 50% under the particular experimental conditions that produced the results in Table 5. Based on FTIR quantification, direct fluorination of bis(trimethylsilyl)amine produced $NF_3$, $Me_3SiF$, and HF. The total $NF_3$ production in the experiment show that over 98% of the nitrogen in bis(trimethylsilyl) amine was accounted in the amount of $NF_3$ produced. These results suggest that the production of $NF_3$ was the dominant mechanism of this process.

Liquid Phase Fluorination of Alkaline Metal Bis(Trimethylsilyl)Amides

The relatively simple procedure for direct fluorination of tris(trimethylsilyl)amine or bis(trimethylsilyl)amine is applicable to metallated amines, such as lithium bis(trimethylsilyl) amide, sodium bis(trimethylsilyl)amide, and potassium bis(trimethylsilyl)amide. Also called hexamethyldisilazides, these compounds are soluble in a wide range of non-polar solvents by virtue of the lipophilic trimethylsilyl groups.

Optimization of Liquid Phase Processes

HF and Scavengers

For processes with of 0.1-10 M bis(trimethylsilyl)amine in solution, HF produced is almost quantitatively evacuated by the sweep gas stream. However, for concentrations above 10 M bis(trimethylsilyl)amine, the HF is not completely evacuated from the solvent, and the introduction of a scavenger to the process was very effective for capture of HF generated by the process as the hydrogen fluoride salt. The scavenger was typically a quaternary amine, such as triethylamine.

Eqn. 3

Solvent and Concentration

The use of a suitable solvent allows the conversion of a large amount of the trimethylsilylamine reagent in Batch or continuous flow processes. The process has to balance the concentration of fluorine feedstock to the overall flow requirement, and to safety. Although, acetonitrile can used as solvent for low temperature fluorination with elemental fluorine, it is hygroscopic, and will be aspirated by high flow processes. An efficient large scale process is best carried out in an aprotic, non-hygroscopic, that may not be easily aspirated from the process. A perfluorocarbon solvent would not react with elemental fluorine, and will allow the operation of these processes at room temperature.

Trimethylsilyl fluoride is a major byproduct of reaction that will be generated in large concentration by the exothermic process. Careful design of appropriate scrubber system is required for this compound in high temperature processes. However, operating this process at room temperature will eliminate the cost of maintenance of cryogenic conditions for the continuous flow process.

Successful determination of safe maximum fluorine absorption for a certain concentration of the trimethylsilylamines will help to select the most efficient $F_2/N_2$ flow. For safety considerations, and in order to prevent significant corrosion, and accompanying replacement cost, it is best to supply elemental fluorine as 5-20% $F_2/N_2$ mixture. Beside, $F_2/N_2$ dilution is useful for the evacuation of $NF_3$ in the flow stream and for effective scrubbing of reactive byproducts.

Gas Phase Continuous Flow Process

Direct fluorination of bis(trimethylsilyl)amine can also be operated as a gas phase process. Direct fluorination of bis(trimethylsilyl)amine is exothermic. It is important to regulate the contacting concentrations of the reagents to prevent an overheated process in continuous production of $NF_3$ by gas phase direct fluorination of bis(trimethylsilyl)amine.

Bis(trimethylsilyl)amine (bp=125° C.; d=0.77 g/cc) may be aspirated by flowing an inert gas through a liquid storage at flow above 50 sccm. It was found useful to aspirate this compound with sulfur hexafluoride or nitrogen. Although sulfur hexafluoride ($SF_6$) is more expensive than nitrogen, it has a much lower thermal conductivity ($SF_6$=12.06×10$^{-3}$ W·m$^{-1}$·K$^{-1}$ at 273 K; and $N_2$=25.83×10$^{-3}$ W·m$^{-1}$·K$^{-1}$ at 300 K). Indeed, Sulfur hexafluoride is an insulating material used as a dielectric in electrical transformers.

When $SF_6$ is the aspirator gas and diluent for bis(trimethylsilyl)amine, the process heat is conducted out of the reactor by the sweep gas stream, and this would minimize the overheating of the reactor when the concentration is higher than 1 mol/min in continuous flow operation.

Figure 3:
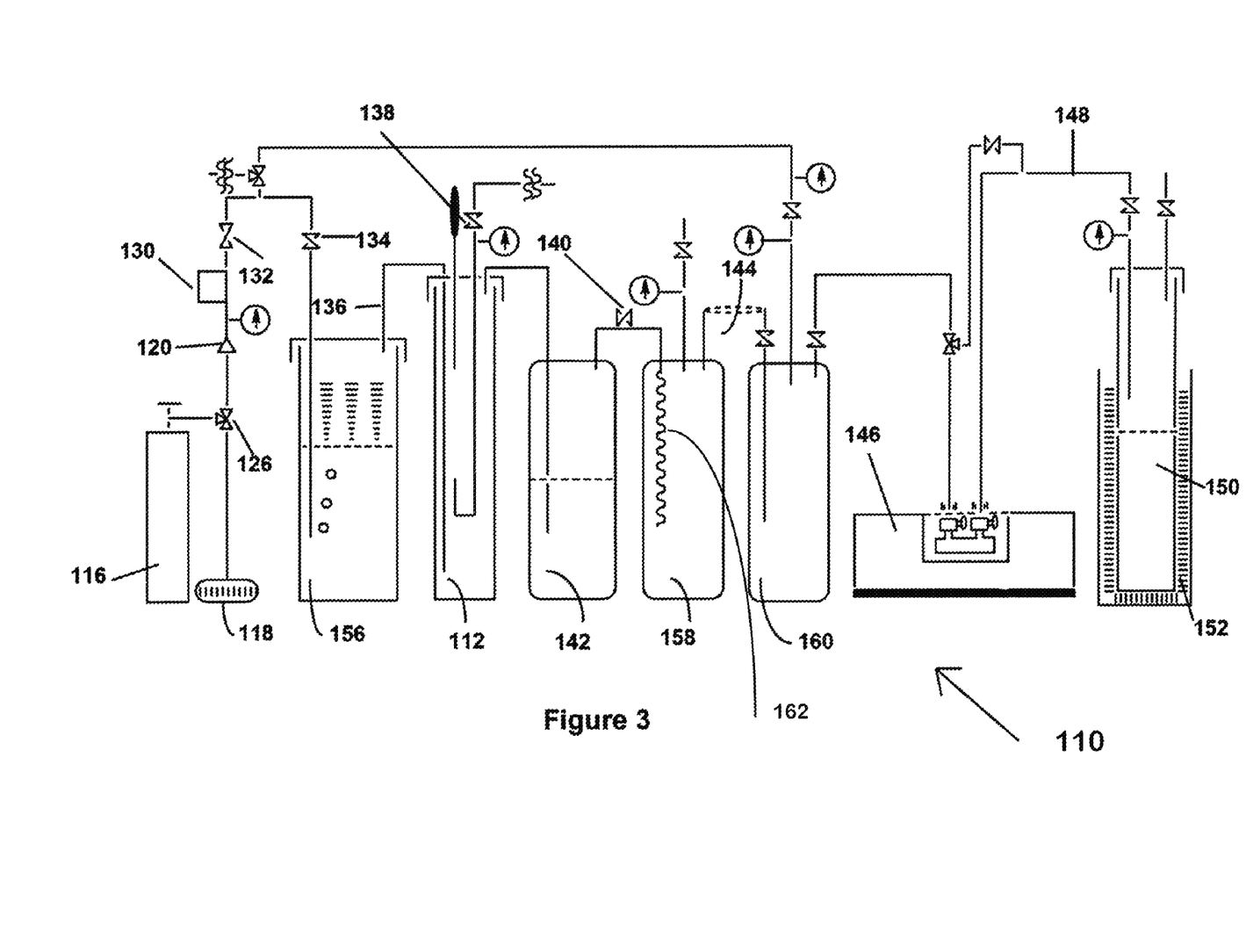
FIG. 3 is a diagram of gaseous phase process for $NF_3$ production.

The facile gas phase fluorination of bis(trimethylsilyl) amine was carried out at room temperature in a 375 cc polytetrafluoroethylene reactor in FIG. 3. Check valves to prevent reverse flow were placed in each of the reagent [(i) 20% $F_2/N_2$ and (ii) bis(trimethylsilyl)amine/$SF_6$] sample lines shortly before conducting polytetrafluoroethylene pipes are introduced into the reactor chamber. Pure sulfur hexafluoride flow at 50 sccm was bubbled through 500 mL liquid bis(trimethylsilyl)amine to aspirate this reagent at steady rate of 20 sccm or 0.000893 mol/min (determined from FTIR calibration). The 20% $F_2/N_2$ flow was set to 0.00286 mol/min, or 320 sccm. The total process flow was 390 sccm during a 3 h of continuous flow process. The online real-time FTIR scan of the process sweep showed that $NF_3$ (FTIR: 5.1% of flow=0.000890 mol/min), trimethylsilyl fluoride $Me_3SiF$ (FTIR: 10.8% of flow=0.000447 mol/min), and HF (4.9% of flow=0.000853 mol) were formed at a constant rate. This is an indication of quantitative conversion of bis(trimethylsilyl) amine to $NF_3$. This result demonstrate the safety of this process; shows that there is no significant scavenging of HF produced. This is an indication that $NH_3$ was rarely or not a generated intermediate, under the process conditions. At the dilutions of this process, the temperature of the polytetrafluoroethylene reactor did not warm above 35 degree Centigrade.

Product Quality

The flow stream for the gas phase process for direct fluorination of bis(trimethylsilyl)amine includes $N_2$, $SF_6$, $F_2$, HF, $NF_3$, and $Me_3SiF$. An online 5-L alkaline scrubber (1-5 M solution of potassium hydroxide) removed reactive fluorine (<5% excess), and HF from the flow stream; followed by a trap kept at 0 degree Centigrade to remove $Me_3SiF$ (bp, 16° C.); a second trap at −78° C. to remove $SF_6$ for recycling to the process; and a third trap at liquid oxygen temperature of −180° C., to remove $NF_3$ (bp, −126° C.). The untrapped $N_2$ from the process is vented after trap 3. This approach has produced crude $NF_3$ product with purity at 99.9%. Further cryogenic purification of this product has produced 99.998+% commercial quality. The total impurity content, including oxygen ($O_2$), water ($H_2O$), nitrogen ($N_2$), total hydrocarbon content, carbon dioxide ($CO_2$), carbon monoxide (CO), ammonia ($NH_3$), nitric oxide ($NO_2$), and nitrous oxide (NO) is less than 20 ppm.

TABLE 4

Data for direct fluorination of tris(trimethylsilyl)amine in acetonitrile at −40 degree Centigrade.

| Time (min.) | Total $NF_3$ produced (cc) | Total mol $NF_3$ produced | Total $F_2$ supplied to process (cc) | Total mol $F_2$ supplied | Flow of 20% $F_2/N_2$ |
|---|---|---|---|---|---|
| 0 | 0 | 0 | 0 | 0 | 0 |
| 3 | 31.3 | 0.0014 | 200 | 0.0446 | 1000 |
| 6 | 62.6 | 0.00277 | 400 | 0.0892 | 2000 |
| 9 | 93.9 | 0.00418 | 600 | 0.134 | 3000 |
| 12 | 125.2 | 0.00559 | 800 | 0.179 | 4000 |
| 15 | 156.5 | 0.00699 | 1000 | 0.223 | 5000 |
| 18 | 187.8 | 0.00838 | 1200 | 0.268 | 6000 |
| 21 | 219.1 | 0.00978 | 1400 | 0.313 | 7000 |
| 24 | 250.4 | 0.0112 | 1600 | 0.357 | 8000 |

TABLE 5

Data for direct fluorination of bis(trimethylsilyl)amine in acetonitrile at −40 degree Centigrade.

| Time (min.) | Total $NF_3$ produced (cc) | Total mol $NF_3$ produced | Total $F_2$ supplied to process (cc) | Total mol $F_2$ supplied | Flow of 20% $F_2/N_2$ |
|---|---|---|---|---|---|
| 0 | 0 | 0 | 0 | 0 | 0 |
| 3 | 14.94 | 0.000667 | 40 | 0.0017857 | 200 |
| 6 | 29.88 | 0.001334 | 80 | 0.0035714 | 400 |
| 9 | 44.82 | 0.002000 | 120 | 0.0053571 | 600 |
| 12 | 59.76 | 0.002668 | 160 | 0.0071428 | 800 |
| 15 | 74.70 | 0.003335 | 200 | 0.0089285 | 1000 |
| 18 | 89.64 | 0.004002 | 240 | 0.0107142 | 1200 |
| 21 | 104.58 | 0.004669 | 280 | 0.0124999 | 1400 |
| 24 | 119.52 | 0.005336 | 320 | 0.0142856 | 1600 |
| 27 | 134.46 | 0.006003 | 360 | 0.0160713 | 1800 |
| 30 | 149.40 | 0.006670 | 400 | 0.017857 | 2000 |
| 33 | 164.34 | 0.007337 | 440 | 0.0196427 | 2200 |
| 36 | 179.28 | 0.008036 | 480 | 0.0214284 | 2400 |
| 39 | 194.22 | 0.008671 | 520 | 0.0232141 | 2600 |
| 42 | 209.16 | 0.009338 | 560 | 0.0249998 | 2800 |
| 45 | 224.10 | 0.010005 | 600 | 0.0267855 | 3000 |
| 48 | 239.04 | 0.010671 | 660 | 0.0285712 | 3200 |
| 51 | 273.60 | 0.012214 | 720 | 0.0312498 | 3300 |
| 54 | 308.16 | 0.013757 | 780 | 0.3392837 | 3600 |
| 57 | 342.72 | 0.015300 | 840 | 0.0366067 | 3900 |
| 60 | 377.28 | 0.016824 | 900 | 0.0392855 | 4200 |
| 63 | 411.84 | 0.018386 | 960 | 0.0419641 | 4500 |
| 66 | 446.40 | 0.019929 | 1020 | 0.0446427 | 4800 |
| 69 | 480.96 | 0.021471 | 1080 | 0.0473212 | 5100 |
| 72 | 515.52 | 0.023014 | 1140 | 0.0499998 | 5400 |
| 75 | 550.08 | 0.024557 | 1200 | 0.0526784 | 5700 |
| 78 | 584.64 | 0.026100 | 1260 | 0.0553569 | 6000 |
| 81 | 619.20 | 0.027643 | 1320 | 0.0580355 | 6300 |

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Shown in FIG. 2 is an example of the production of $NF_3$ from tri(trimethylsilyl)amine and bi(trimethylsilyl)amine in a liquid phase process, designated 10. Shown in FIG. 2 is a laboratory scale version of the method of the invention. Each of the pieces of equipment and quantities of reagents would be scaled up in a production mode, but the laboratory scale version serves as an example of one preferred embodiment. Shown in FIG. 2 is a polytetrafluoroethylene reaction vessel 12 which in this case is 2 inches in diameter and 12 inches in height, and roughly 375-mL in volume. Inserted into the reaction vessel 12 is a mechanical stirrer 14 which is present in the solution, with impeller 24. The method of the invention starts by filling the reaction vessel 12 with a solution of $N(SiMe_3)_3$. In the case of a laboratory scale version, this could comprise 275 mL acetonitrile solution of 5 g of this amine reagent. The next step of the process involves directing a stream of $F_2/N_2$ gas into the reagent of $N(SiMe_3)_3$, and bubbling the $F_2/N_2$ through the solution. The $F_2/N_2$ gas mixture is preferably a 20% $F_2$/80% $N_2$.

The polytetrafluoroethylene reactor 12 is surrounded by a cryogenic cooling jacket 22, with one made by cooling ethanol with dry ice being an example of a suitable cryogenic cooling jacket. A temperature of approximately −4 to −40 degrees Centigrade is maintained in the reaction vessel 12. The $F_2/N_2$ reagent is stored in a source container 16 and it flows to the reaction vessel through pipes typically made of stainless steel in the case of the laboratory scale version. The $F_2/N_2$ source is a tank with a volume of 275 L, which holds approximately 100 g of fluorine. It flows through a first valve 26, through a pressure regulator 20 past a mass flow controller (MFC) 30, past a second valve 32 and a third valve 34 and is impinged into the reagent in the reaction vessel 12.

Connected to the first valve 26 is a vacuum source 18 which serves the purpose of evacuating the lines if necessary. In the reaction vessel 12, $F_2/N_2$ combines with the solution of tris (trimethylsilyl)amine to produce predominantly $NF_3$ gas which exits the reaction vessel at exit port 36, and flows past fourth valve 38 and fifth valve 40 into an alkali scrubber 42.

The alkali scrubber 42, also called trap 1, serves to remove unreacted fluorine and generated HF from the flow of $NF_3$ gas. The line 54 which connects the reaction vessel 12 to the scrubber 42, in the case of the laboratory scale set up, is made of polytetrafluoroethylene tubing and has an internal diameter of approximately ¼ inches. The alkali scrubber 42 is preferably made of fluoropolymer, and in this version is approximately 15 inches in diameter, and 24 inches in height. It is filled with approximately 2.5 L of KOH solution of 1-5 M.

Another significant byproduct from the reaction in the reaction vessel 12 is $Me_3SiF$, indicated at 62, which can be collected and sold to recover its commercial value.

The stream of $NF_3$ gas from the reaction vessel 12 exits the scrubber 42 and passes through an inline dryer 44. The inline dryer can take a number of forms, but a dryer packed with a mixture of catalysts made by Aeronex has proven suitable for this purpose. From the scrubber 42 the flow of $NF_3$ gas passes through analytical instrumentation 46, which would typically be a Fourier Transform infrared (FTIR) spectrometer. A readout of FTIR data from the process is shown in FIG. 1.

From the analytical instrumentation 46 a line 48 made of polytetrafluoroethylene tubing or stainless steel and approximately ¼ inches in internal diameter, flows to an $NF_3$ collection vessel called trap 2 and designated 50, which is enclosed in a second cryogenic cooling jacket 52. In trap 2, NF$_3$ is collected as a liquid and is kept at approximately −196 degree Centigrade. From the second trap 50, the liquid NF$_3$ may be drained off for storage, further purification, or may be released to vent. Trap 2 at 50 is preferably made of stainless steel, and at this scale is approximately 3 inches in diameter, and 18 inches in height, and holds approximately 300 mL of NF$_3$.

Shown in FIG. 3 is another preferred embodiment of the invention, which is basically a variation of the process of the invention and a preferred embodiment of the invention. The components shown in FIG. 3 will be designated in a 100 series, and will have the last two digits congruent with the numbering of the embodiment shown in FIG. 2 where possible.

Shown in FIG. 3 is a laboratory scale version of a preferred embodiment of the invention, designated 110. Shown is an SF$_6$ source 116, which in the laboratory scale version is a pressurized tank holding 50 pounds of pure SF$_6$. A vacuum source is present at 118 and the line from the SF$_6$ source 116 can be routed to storage or recycling, to trap 2 or to an aspiration chamber upstream from a polytetrafluoroethylene reaction vessel 112. The line from the SF$_6$ tank 116 to the reaction vessel 112 is preferably made of polytetrafluoroethylene or stainless steel, of ¼ inches diameter.

SF$_6$ gas from tank 116 is routed to an aspiration chamber 156 made of polytetrafluoroethylene, 2 inches in diameter, and 8 inches in height. In the aspiration chamber 156, SF$_6$ flows through approximately 200 cc of liquid bis(trimethylsilyl)amine to produce a steady dilution of the amine in the gas flow. The micro droplets of the amine in SF$_6$ are routed from vessel 156 to the reaction vessel 112, flowing to the reaction chamber 112 via tubing made of stainless steel, ¼ inches in diameter.

The polytetrafluoroethylene reaction vessel is approximately 24 inches tall and 3 inches in diameter, and is connected to the aspiration chamber 156 by a section of polytetrafluoroethylene tubing or stainless steel tubing of ¼ inches in diameter. In the reaction chamber 112, bis(trimethylsilyl) amine mixes with F$_2$/N$_2$ dilution to produce NF$_3$, HF, and Me$_3$SiF, which passes into the KOH scrubber 142. The KOH scrubber contains approximately 2.5 L of 1-5 molar KOH. The KOH scrubber absorbs unreacted fluorine, and HF, and after the gas from the polytetrafluoroethylene reactor bubbles through the KOH scrubber 142, it passes into trap 1 at 158.

Trap 1 is designated 158 and is made of polytetrafluoroethylene tubing or stainless steel, and is 2 in diameter, and 8 in. in height. Trap 1 is held at 0 degrees Centigrade to condense Me$_3$SiF. Shown in FIG. 3 is a coil piping for better cooling efficiency because 0 degree Centigrade is close to the 16 degree Centigrade boiling point of Me$_3$SiF. From trap 1 at 158, the crude NF$_3$ gas passes through a dryer at 144 and into trap 2, designated 160. Trap 2 is a tank made of polytetrafluoroethylene tubing or stainless steel, 2 in. in diameter, and 8 in. in height.

Trap 2 is held at −78 degrees Centigrade, by use of a cryogenic cooler using dry ice and acetone, or another suitable cooling means. From trap 2, crude NF$_3$ passes to the analytical instrumentation 146, preferably a Fourier Transform infrared (FTIR) spectrometer where purity is monitored.

From the analytical instrumentation 146, NF$_3$ gas passes in line 148 to Trap 3, designated 150, for cooling to −196 degrees Centigrade, at which temperature it forms a liquid. A cryogenic cooler 152 cools the NF$_3$ product. Trap 3 is made of stainless steel, and is approximately 3 inches in diameter and 18 in height. From Trap 3, the liquid NF$_3$ is available for venting, purification, or storage.

Figure 4:
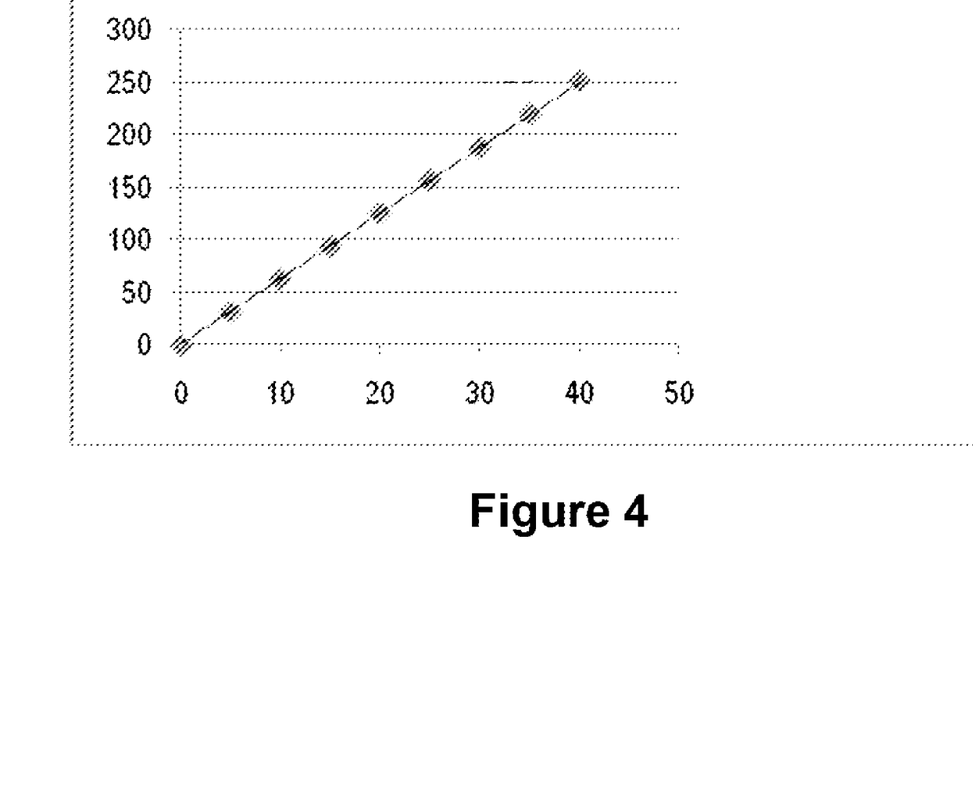
FIG. 4 is a graph showing fluorination time vs FTIR yield.

FIG. 4 is a plot of fluorination time (min.) versus the FTIR yield in sccm. The squares represent the total NF$_3$ produced in sccm, which when connected show a linear production of NF$_3$.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A method of producing nitrogen trifluoride comprising the steps of:
   providing a source of elemental fluorine gas;
   providing a solution of tris(trimethylsilyl)amine as a reagent;
   mixing said fluorine gas with a solution of said tris(trimethylsilyl)amine in a reaction vessel resistant to fluorine corrosion gas, at a temperature configured to produce NF$_3$ gas or NF$_3$ liquid;
   passing said NF$_3$ gas or said NF$_3$ liquid through an alkaline scrubber; and
   collecting liquid NF$_3$ in a collection vessel held at approximately −196° C. by cryogenic cooling.

2. The method of claim 1 which further comprises the step of providing analytical instrumentation between said alkaline scrubber and said collection vessel.

3. The method of producing nitrogen trifluoride of claim 1 which further comprises the steps of:
   placing a 0.1-10 M solution of said tris(trimethylsilyl) amine in acetonitrile in said reaction vessel;
   maintaining a temperature of said reaction vessel between −4° C. and −45° C.;
   passing a mixture of F$_2$/N$_2$ through said solution of tris (trimethylsilyl)amine in acetonitrile to produce a sweep gas flow of NF$_3$ gas, fluorine, and hydrogen fluoride;
   passing said sweep gas flow through an alkaline scrubber to remove unreacted fluorine and hydrogen fluoride from the NF$_3$ in the sweep gas flow;
   passing NF$_3$ gas to a cooled collection vessel for collection of liquid NF$_3$.

4. The method of claim 3 which further comprises the step of providing a mix of 20% of F$_2$/N$_2$ gas for passing through said solution of tris(trimethylsilyl)amine.

5. The method of claim 3 which further comprises the step of providing analytical instrumentation between said alkaline scrubber and said collection vessel.

6. The method of claim 3 further comprising providing a polytetrafluoroethylene vessel for the reaction vessel.

7. A method of producing nitrogen trifluoride which comprises the steps of:
   placing a solution of bis(trimethylsilyl)amine in an aspiration chamber;
   passing SF$_6$ gas through said aspiration chamber to produce a dilution of amine in the aspiration chamber in the form of micro droplets in the SF$_6$ gas;
   placing approximately 1-10 M acetonitrile solution of bis (trimethylsilyl)amine in a reaction vessel;
   maintaining a temperature of said reaction vessel between −4° C. and −45° C. by use of cryogenic cooling;
   passing said SF$_6$ gas having micro droplets of the amine into said reaction chamber, to produce a process gas flow of NF$_3$ gas and Me$_3$SiF;

passing said process gas flow through an alkaline scrubber for removal of non $NF_3$ by products from said process gas flow;

passing $NF_3$ gas from said alkaline scrubber to a trap held at approximately 0° C., for condensation of $Me_3SiF$ from said process gas flow;

passing said $NF_3$ gas from said trap to a second trap, held at −78° C. to remove $SF_6$;

passing $NF_3$ gas stream to a collection vessel held at −196° C. for condensation into liquid $NF_3$.

* * * * *

UNITED STATES PATENT AND TRADEMARK OFFICE
CERTIFICATE OF CORRECTION

PATENT NO. : 8,163,262 B1
APPLICATION NO. : 12/983988
DATED : April 24, 2012
INVENTOR(S) : Bamidele A. Omotowa It is certified that error appears in the above-identified patent and that said Letters Patent is hereby corrected as shown below:

In the Specification

Please insert the following paragraph under the paragraph heading, --Statement Regarding Federally Sponsored Research or Development--:

--This invention was made with Government support under NSF Award No. 1127186 (Title: "NIFUT Technology for recycling fluorides from Uranium Tetrafluoride") awarded by the National Science Foundation. The Government has certain rights in this invention. 45 CFR 650.4(f)(4).--

Signed and Sealed this
Third Day of June, 2014

Michelle K. Lee
*Deputy Director of the United States Patent and Trademark Office*